United States Patent

Fisher

[11] Patent Number: 5,535,541
[45] Date of Patent: Jul. 16, 1996

[54] FISHING HOOK GUARD

[76] Inventor: Jerry A. Fisher, 205 Fair St., Moville, Iowa 51039

[21] Appl. No.: 402,388

[22] Filed: Mar. 13, 1995

[51] Int. Cl.⁶ .................................................. A01K 97/06
[52] U.S. Cl. .............................................. 43/57.1; 43/25.2
[58] Field of Search ........................... 43/25.2, 25, 57.1, 43/54.1

[56] References Cited

U.S. PATENT DOCUMENTS

| | | | |
|---|---|---|---|
| 2,482,881 | 9/1949 | Sonner, Jr. | 43/57.5 |
| 2,716,302 | 8/1955 | Dutton | 43/57.1 |
| 2,775,060 | 12/1956 | Barker | 43/43.2 |
| 2,841,917 | 7/1958 | Haskell | 43/54.5 |
| 2,993,293 | 7/1961 | Blout | 43/57.5 |
| 3,104,487 | 9/1963 | Havel | 43/43.11 |
| 3,141,258 | 7/1964 | Mayer | 43/57.5 |
| 3,295,245 | 1/1967 | Mullikin | 43/57.5 |
| 3,363,357 | 1/1968 | Sokol | 43/42.4 |
| 3,670,445 | 6/1972 | Borger | 43/42.4 |
| 3,940,873 | 3/1976 | Lawless | 43/57.5 |
| 4,081,116 | 3/1978 | Fliegelman et al. | 224/5 A |
| 4,667,433 | 5/1987 | Thompson, Jr. | 43/25.2 |
| 4,757,637 | 7/1988 | Christensen | 43/57.1 |
| 4,862,635 | 9/1989 | Conte | 43/57.1 |
| 4,879,832 | 11/1989 | Nelson | 43/25.2 |
| 5,020,264 | 6/1991 | Demski | 43/25.2 |
| 5,123,199 | 6/1992 | Lysohir et al. | 43/57.1 |

Primary Examiner—J. Elpel
Attorney, Agent, or Firm—Zarley, McKee, Thomte, Voorhees, & Sease

[57] ABSTRACT

A fishing hook guard includes an elongated tubular base having a closed bottom end and an open top end and an inside diameter for receiving the point and barb of the hook and a cap adapted to fasten to and cover the open top end of the base so as to lock the point and barb of the hook in the guard. The cap and base are fastened together to hold the intrusive end of the hook thereinside. One or more longitudinal slots can be provided in the open top end of the base to receive the shaft of the hook. A generally lateral and outwardly protruding flange is interposed between the ends of the base to protect the user's thumb and/or fingers from being inadvertently poked during an attempted insertion of the hook into the base. Structures for aiding the user in gripping the outside of the guard are provided thereon.

11 Claims, 2 Drawing Sheets

FISHING HOOK GUARD

BACKGROUND OF THE INVENTION

The present invention relates to the field of fishing. More particularly, this invention relates to a guard for covering the points and barbs of hooks that are used for fishing.

Accidents and mishaps involving fishing hooks are well known. Unintended snags of hooks during both use and storage make them both dangerous and annoying. When stored in a tackle box, hooks can present a hazard to an angler who reaches inside the box. Furthermore, fishing hooks are difficult to store in a tackle box because they often become entangled with or puncture other items stored therein.

A point and a barb are typically found on the intrusive portion of known hooks. Various devices for covering the intrusive portion of a hook are known in the art. However, these existing devices typically suffer one or more shortcomings, such as being bulky, awkward to use, easy to dislodge, dangerous to use, or prone to allow moisture to reach the hook. Therefore, a primary object of this invention is the provision of a fishing hook guard which is an improvement over the prior art.

A further object of this invention is the provision of a fishing hook guard that is convenient and durable in use.

A further object of the present invention is the provision of a fishing hook guard that will partially extend through and engage one of the eyes disposed on a fishing rod.

A further object of this invention is the provision of a fishing hook guard that is economical to manufacture.

A further object of the present invention is the provision of a fishing hook guard that is compact and easy to store on a fishing rod, in a tackle box, or in an angler's pocket.

A further object of the present invention is the provision of a fishing hook guard that has an integral protective collar that decreases the chances the user will be injured while inserting the hook into the guard.

A further object of the present invention is the provision of a fishing hook guard that is easily adaptable to fishing hooks of various sizes, shapes, and types.

These and other objects will become apparent from the following description of the invention.

SUMMARY OF THE INVENTION

The fishing hook guard of the present invention includes an elongated tubular base having a closed bottom end and an open top end and an inside diameter sufficient for receiving the point and barb of the hook, and a cap adapted to fasten to and cover the open end of the base so as to lock the point and barb of the hook in the guard. The cap and base are fastened together to hold the intrusive end of the hook thereinside. One or more longitudinal slots are provided in the open top end of the base to receive the shaft of the hook. A generally lateral and outwardly protruding flange is preferably interposed between the ends of the base to protect the user's thumb and/or fingers from being inadvertently poked when attempting to insert the hook into the base. Gripping elements for aiding the user in grasping the outside of the guard are provided thereon.

DETAILED DESCRIPTION OF THE PREFERRED EMBODIMENT

Figure 1:
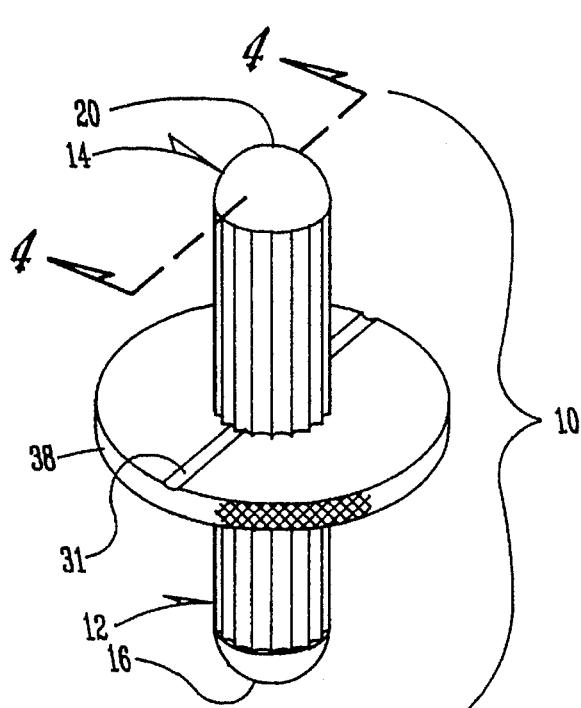
FIG. 1 is a perspective view of the fishing hook guard of this invention.

In the figures and in the description which follows, the fishing hook guard of the present invention is denoted by reference numeral 10. In FIG. 1, guard 10 is shown to include an elongated base 12 having a detachable cap 14 fastened thereto. Preferably, both base 12 and cap 14 are tubular in construction.

Figure 2:
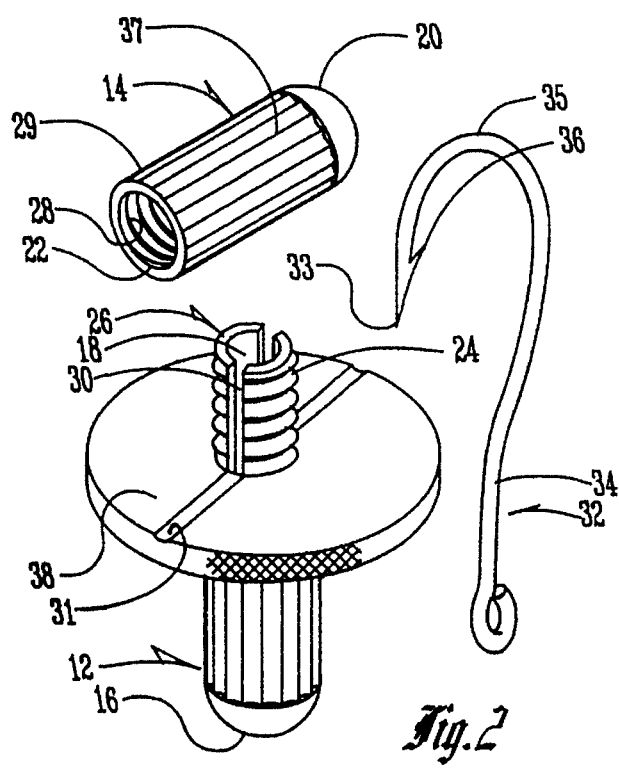
FIG. 2 is an exploded view of the fishing hook guard of FIG. 1 with the cap rotated to expose the fastening means disposed thereon.

The elongated tubular base 12 has a closed end 16 and an open end 18 opposite to the closed end 16, as best seen in FIG. 2. Cap 14 has a closed end 20 and an open end 22. Fastening means, such as threads 24 for example, are disposed on the upper portion 26 of base 12 and engage mating fastening means, such as threads 28, disposed on the lower portion 29 of the cap 14. Therefore, cap 14 is securably fastenable to base 12, yet can be removed with one hand.

Although the fastening means, threads 24 and 28, are shown located on the outside of the upper portion 26 and the inside of the lower portion 29 respectively, it is contemplated that the fastening means could be located on the inside of the base 12 and the outside of the lower portion 29 of the cap 14 respectively without detracting from the invention. Furthermore, the use of other known fastening means, including but not limited to generally lateral interlocking ribs or a plain interference fit, would not detract from the invention.

The shapes of the base 12 and the cap 14 are preferably cylindrical as shown in FIG. 1, but other shapes are acceptable and contemplated. For instance, a triangular, square, or rectangular cross-section would not detract from the invention if linear rather than rotary fastening means were utilized.

Referring to FIG. 2, one or more slots 30 are formed in the upper portion 26 of the base 12. Preferably, two slots 30 extend through the periphery of the upper portion 26 and are disposed longitudinally, approximately 180° apart. Indicia 31, such as marks, grooves, or surface aberrations discernible by touch or sight, are located on base 12 aligned with and adjacent to the slots 30. To install the guard 10 on a hook 32, the intrusive end of the hook is positioned adjacent the open top end 18 and the shaft 34 of the hook is aligned with one of the slots 30 using indicia 31. The point 33 and the barb 36 of the hook 32 are centrally positioned over the open top end 18.

Next, the point 33 and the barb 36 are moved through the open top end 18 into base 12 and shaft 34 is inserted in one of the slots 30. The hook 32 is lowered until the shaft 34 rests at the bottom of one of the slots 30 (see FIG. 4).

Figure 3:
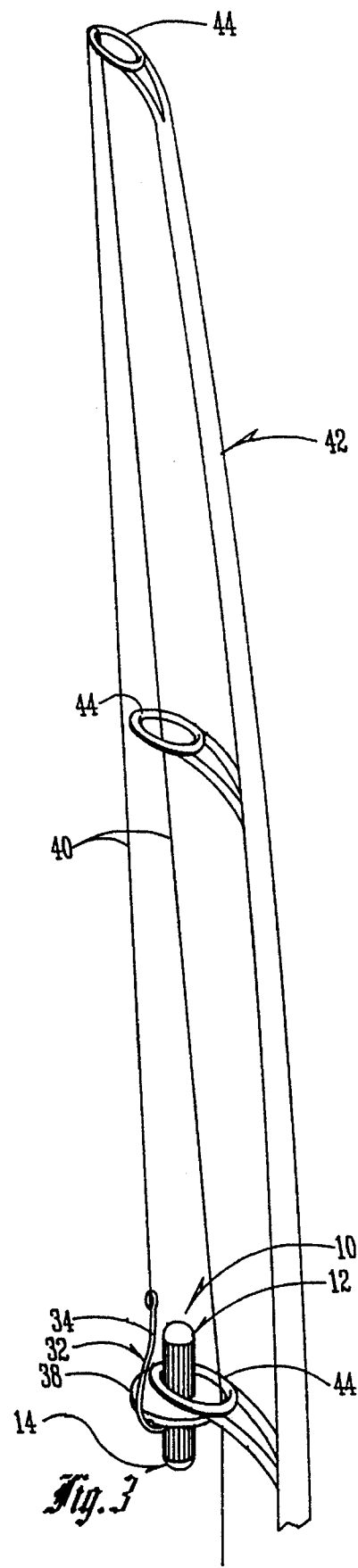
FIG. 3 is a perspective view of the fishing hook guard of this invention securing a hook and line to an eye disposed on a fishing rod.

Next, the cap 14 is grasped and the lower portion 29 thereof is preferably fastened by threads 24 and 28 to the upper portion 26 of the base 12. The lower portion 29 of the cap 14 presses downwardly on the shaft 34 until the latter is trapped at the bottom of the slot 30. Thus, the intrusive end of the hook 32 is covered and trapped by the guard 10, but a substantial portion (including the bend 35) of the shaft 34 of the hook remains free. The intrusive end or barbed portion of the hook 32 is essentially encapsulated as shown in FIG. 3. Therefore, the intrusive end of the hook 32 is less likely to puncture, scratch, or snag anything or anyone when covered by the guard 10.

Preferably, a plurality of generally longitudinal ribs 37 are formed on the outside of cap 14 to aid the user in gripping and turning it with respect to the base 12 (See FIGS. 1 and 2). It is contemplated that the base 12 could be similarly equipped with ribs for the same purpose. Knurling or texturing of the outer surfaces of the guard 10 is also contemplated for this reason.

A protective collar or flange 38 is attached to the base 12 just below the threads 24 and extends therefrom in a generally lateral direction, as best seen in FIG. 2. Collar 38 provides limited protection for the user's thumb and/or fingers should the user miss the open end 18 of the base 12 when attempting to insert the intrusive end of the hook 32 into the guard 10. Because the diameter of the collar 38 is larger than that of the base 12, collar 38 provides an alternate place for the user to grasp and apply more tightening or disengaging torque.

Each slot 30 accommodates at least one hook 32. As should be understood from FIGS. 2–4, the slots 30 are approximately as wide as the diameter of the shaft 34 of the hook 32, but narrower than the maximum cross-sectional dimension of the hook 32 at the barb 36. Preferably, the slots 30 are approximately one-thirty-second of an inch wide and extend three-eighths of an inch downward from the open end 18 of the base 12 to accommodate the hook 32. One skilled in the art will recognize that each slot 30 can be dimensioned so as to hold a plurality of hooks stacked vertically or laid side by side in the slot.

Figure 4:
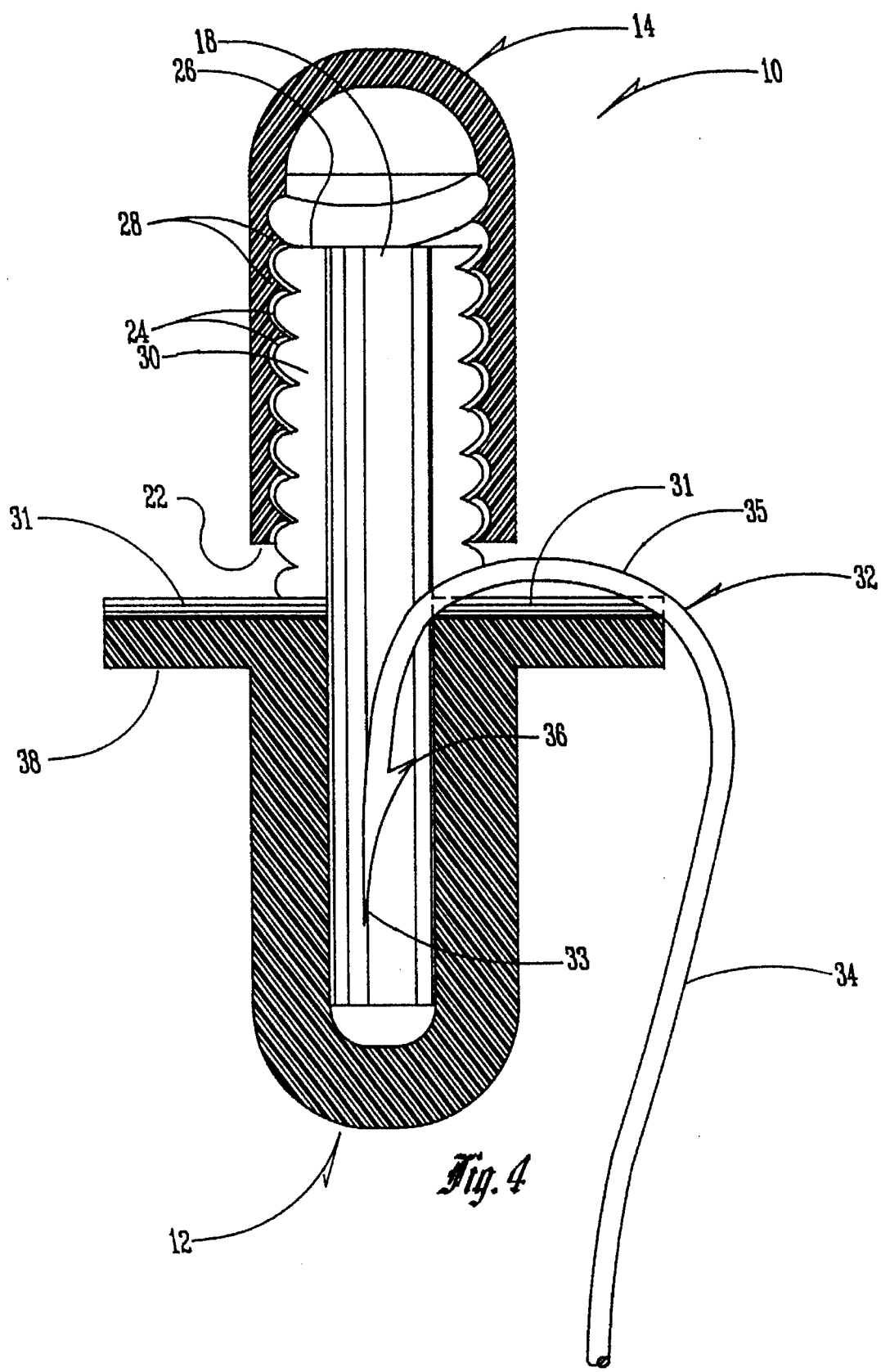
FIG. 4 is an enlarged scale cross-sectional view of the guard of FIG. 1 taken along line 4—4 with a hook installed therein.

As seen in FIG. 4, the inside depth of the base 12, from the lower end of slots 30 to the closed end 16, is sufficient to accommodate the intrusive end of the hook 32. It is contemplated that the base 12 can be constructed with a relatively large effective inside depth versus inside diameter ratio to accommodate a broad range of hook sizes. For instance, good results have been obtained with a base 12 having a one-quarter of an inch inside diameter and an effective inside depth of five-eighths of an inch. Such a base accommodates most sizes of hooks which are commonly used in freshwater fishing. Furthermore, a guard 10 with a base 12 of this size can be used on everything from small jigs to large spinner hooks having barbs with a three-sixteenths of an inch maximum cross-section dimension. The hooks used for saltwater fishing are generally larger than freshwater fishing hooks and will require larger guards in some instances.

In FIG. 3, fishing hook guard 10 is shown encapsulating a hook 32 conventionally connected to a fishing line 40 that extends through a plurality of eyes 44 which extend in a generally lateral direction from fishing rod 42. The width or maximum lateral dimension of the base 12 is small enough to fit inside the inner diameter of one of the eyes 44, thus allowing the base 12 to be inserted upwardly through eye 44 with the base 12 or the whole guard 10 installed on the hook 32. It is known in the art to position the intrusive portion of an unprotected hook in eye 44 to secure the line 40 and hook 32 to the rod 42 for storage. However, existing guards and storage devices are bulky and prevent the hook from being secured to the eye in the conventional manner. The compact tubular base 12 of the present invention facilitates rather than interferes with the attachment of the line 40 with the hook 32 thereon to the eye 44 of the fishing rod 42 for storage.

In the preferred embodiment where the guard 10 is equipped with a collar 38, the collar engages or abuts the bottom of the eye 44 once the slack is removed from the line 40. If the guard 10 does not have the optional collar, the guard 10 still allows the hook 32 to be secured to the eye 44, but the outermost portion of eye 44 will be engaged by the guard 10 or the hook 32 closer to the bend 35.

One skilled in the art will recognize that the guard 10 covers very little of the hook other than the barb 36 and the point 33. Therefore, it is easily adaptable to various sizes and styles of hooks. One size of guard 10 will fit many different sizes of hooks and a variety of different sizes of guards can be provided to cover a wide range of hook sizes. The guard 10 of the present invention can also individually cover each of the intrusive ends of a multiple hook such as a double hook, treble hook, and so forth.

Preferably, the fishing hook guard 10 of this invention is constructed of a lightweight and durable material, such as plastic, wood, and the like. The material should be rigid, yet resilient. Plastic is preferred for its ability to be molded at low cost in a variety of colors.

The guard 10 of this invention is used to guard a hook as described below. First, the guard is installed on the hook as previously described. Once installed, the guard 10 can be used in a dual capacity to both cover the hook 32 and secure it to the eye 44 of a fishing rod 42. The base 12 (with a hook 32 therein) is positioned so the closed end faces upwardly. Then the base 12 is inserted upwardly through an eye 44 on the rod 42, until the hook 32, collar 38, or both inhibit any further upward movement. Next, the line 40 attached to hook 32 is tightened or reeled in until taut and locked against further extension, thus securing the hook 32 and the line 40 to the eye 44. In fact, when line 40 becomes taut, a generally upward and outward force is applied to the hook 32. This force tends to help keep the base 12 engaged with the eye 44.

The guard 10 is storable in an angler's pocket or tackle box until needed. Once a guard 10 is installed on a hook 32 or each hook on a lure or jig, the tackle can be neatly, safely, and compactly returned to storage in a pocket, in a tackle box, or on the eye 44 of the rod 42 as noted above.

Whereas the invention has been shown and described in connection with the preferred embodiments thereof, it will be understood that modifications, substitutions, and additions may be made which are within the intended broad scope of the following claims. From the foregoing, it can be seen that the present invention accomplishes at least all of the stated objectives.

I claim:

1. An apparatus for guarding a fishing hook having a shaft terminating in at least one point and a barb extending rearwardly and outwardly from the point, comprising:

a vertically elongated tubular base portion for receiving the point and the barb of the hook thereinside, the base portion having a closed bottom end and an open top end and an inside diameter at the open top end at least as great the maximum transverse cross-sectional dimension of the hook at the barb;

the base portion having a longitudinal slot therein for receiving the shaft of the hook, the slot extending from the open top end of the base portion toward the closed end of the base portion;

the base portion having a generally lateral and outwardly protruding flange formed on the base portion and interposed between the open top end and the closed bottom end of the base portion so as to protect a user from being inadvertently injured by the hook during insertion thereof into the base portion; and a cap having a closed upper end, a continuous side wall and an opposite lower end adapted for fastening to and covering the open end of the base portion and substantially covering the longitudinal slot so as to lock the point and the barb of the hook in a substantially vertical resting position inside of the base portion while a portion of the shaft of the hook remains outside the base portion.

2. The apparatus of claim 1 wherein a second longitudinal slot extends from the open top end of the base portion toward the closed end of the base portion and is disposed generally opposite the first slot.

3. The apparatus of claim 1 wherein gripping means are provided on one of the cap and base portion.

4. The apparatus of claim 3 wherein the gripping means include a plurality of generally longitudinal ribs formed on an outer surface of one of the cap and base portion.

5. The apparatus of claim 1 wherein gripping means are provided on both the cap and the base portion.

6. The apparatus of claim 1 wherein the base portion and the cap are substantially cylindrical in shape.

7. The apparatus of claim 1 wherein the base portion and the cap are both made of a plastic material.

8. The apparatus of claim 1 wherein the slot has a length and a width, the length of the slot being greater than the width of the slot.

9. An apparatus for guarding a fishing hook having a shaft terminating in at least one point and a barb extending rearwardly and outwardly from the point, comprising:

an elongated tubular base portion for receiving the point and the barb of the hook thereinside, the base portion having a closed bottom end and an open top end and an inside diameter at the open top end at least as great the maximum cross-sectional dimension of the hook at the barb;

the base portion having a longitudinal slot therein for receiving the shaft of the hook, the slot extending from the open top end of the base portion toward the closed end of the base portion; and a cap having a closed upper end and an opposite lower end adapted for fastening to and covering the open end of the base portion so as to lock the point and the barb of the hook inside of the base portion;

the open top end of the base portion having threads thereon and the lower end of the cap having threads thereon mating with the threads on the base portion.

10. The apparatus of claim 9 wherein the threads are disposed on an outer periphery of the open top end of the base portion and the mating threads are disposed on an inner periphery of the lower end of the cap.

11. An apparatus for guarding a fishing hook having a shaft terminating in at least one point and a barb extending rearwardly and outwardly from the point, comprising:

an elongated tubular base portion for receiving the point and the barb of the hook thereinside, the base portion having a closed bottom end and an open top end and an inside diameter at the open top end at least as great the maximum cross-sectional dimension of the hook at the barb;

the base portion having a longitudinal slot therein for receiving the shaft of the hook, the slot extending from the open top end of the base portion toward the closed end of the base portion; and a cap having a closed upper end and an opposite lower end adapted for fastening to and covering the open end of the base portion so as to lock the point and the barb of the hook inside of the base portion;

the base having a generally lateral and outwardly protruding flange formed on the base portion and interposed between the open top end and the closed bottom end of the base portion so as to protect a user from being inadvertently injured by the hook during insertion thereof into the base portion;

the flange having a radially disposed slot therein adjacent to and generally aligned with the longitudinal slot so as to receive the shaft.

* * * * *